(12) United States Patent
Briceno Garcia et al.

(10) Patent No.: US 9,984,789 B2
(45) Date of Patent: May 29, 2018

(54) MEDIUM- OR HIGH-VOLTAGE ELECTRIC DEVICE

(71) Applicant: NEXANS, Paris (FR)

(72) Inventors: Ruben Briceno Garcia, Villeurbanne (FR); Jean-Michel Marty, Sainte Foy les Lyon (FR); Maud Thivillon, Thurins (FR); Yannick Goutille, Villeurbanne (FR); Laurent Keromnes, Chaponost (FR)

(73) Assignee: NEXANS, Paris (FR)

( * ) Notice: Subject to any disclaimer, the term of this patent is extended or adjusted under 35 U.S.C. 154(b) by 0 days. days.

(21) Appl. No.: 14/895,090

(22) PCT Filed: Jun. 3, 2014

(86) PCT No.: PCT/FR2014/051317
§ 371 (c)(1),
(2) Date: Dec. 1, 2015

(87) PCT Pub. No.: WO2014/195629
PCT Pub. Date: Dec. 11, 2014

(65) Prior Publication Data
US 2016/0125974 A1 May 5, 2016

(30) Foreign Application Priority Data

Jun. 4, 2013 (FR) ..................................... 13 55102
Oct. 1, 2013 (FR) ..................................... 13 59471

(51) Int. Cl.
*H01B 3/00* (2006.01)
*H01B 3/44* (2006.01)
(Continued)

(52) U.S. Cl.
CPC .......... *H01B 3/447* (2013.01); *C08F 224/00* (2013.01); *H01B 3/40* (2013.01); *H01B 3/441* (2013.01); *H01R 4/10* (2013.01)

(58) Field of Classification Search
USPC .............. 174/110 R, 110 SC, 102 R, 102 SC
See application file for complete search history.

(56) References Cited

U.S. PATENT DOCUMENTS 2,930,835 A * 3/1960 Bollmeier ............ H02G 15/113
156/48
4,042,550 A * 8/1977 Tuller ..................... C08L 63/00
257/E23.121
(Continued)

FOREIGN PATENT DOCUMENTS

| JP | 10273519 | 10/1998 |
| JP | 10273569 | 10/1998 |

(Continued)

OTHER PUBLICATIONS

Search Report dated 2014.
(Continued)

*Primary Examiner* — William H Mayo, III
(74) *Attorney, Agent, or Firm* — Sofer & Haroun, LLP

(57) ABSTRACT

An electric device has a cross-linked layer obtained from a polymer composition that includes at least one polymer having at least one epoxy function. The polymer composition also has a non-polymer compound as a cross-linking agent including at least one reactive function that can react with the epoxy function of the polymer in order to allow the polymer to be cross-linked.

18 Claims, 3 Drawing Sheets

(51) Int. Cl.
*H01B 3/40* (2006.01)
*C08F 224/00* (2006.01)
*H01R 4/10* (2006.01)

(56) References Cited

U.S. PATENT DOCUMENTS

| | | | | |
|---|---|---|---|---|
| 4,923,908 | A * | 5/1990 | Lostumo | C08K 3/22 427/386 |
| 2012/0227997 | A1* | 9/2012 | Koelblin | H01B 1/24 174/102 SC |
| 2013/0206453 | A1* | 8/2013 | Fagrell | H01B 3/441 174/120 SC |
| 2013/0220666 | A1* | 8/2013 | Fagrell | C09D 123/0884 174/120 SC |
| 2013/0284486 | A1* | 10/2013 | Nilsson | H01B 3/441 174/107 |
| 2013/0306351 | A1* | 11/2013 | Lambert | H01B 3/44 174/120 SC |
| 2014/0083739 | A1* | 3/2014 | Jeker | H01B 1/24 174/120 SC |

FOREIGN PATENT DOCUMENTS

| | | | | |
|---|---|---|---|---|
| WO | WO 2012/052077 A | * | 4/2012 | H01B 3/40 |
| WO | 2013/110893 | | 8/2013 | |

OTHER PUBLICATIONS

Kim K S et al. "Cross-linked Polyolefin Composition Having Excellent electrical Insulation Property and Thermal Stability." WPI/THOMSON, vol. 2005, No. 48, (Feb. 23, 2005).
Search Report dated Jun. 20, 2014.

\* cited by examiner

MEDIUM- OR HIGH-VOLTAGE ELECTRIC DEVICE

RELATED APPLICATIONS

This application is a National Phase Application of PCT/FR2014/051317, filed on Jun. 3, 2014, which in turn claims the benefit of priority from French Patent Application Nos. 13 55102 filed on Jun. 4, 2013 and 13 59471, filed on Oct. 1, 2013, the entirety of which are incorporated herein by reference.

BACKGROUND

Field of the Invention

The present invention relates to an electrical device of the electric cable or electric cable accessory type. It typically but not exclusively applies to the fields of low-voltage (in particular of less than 6 kV), medium-voltage (in particular from 6 to 45-60 kV) or high-voltage (in particular greater than 60 kV, and which can range up to 800 kV) power cables, whether they are direct current or alternating current.

Description of Related Art

OBJECTS AND SUMMARY

Power cables typically comprise a central electrical conductor and at least one electrically insulating layer crosslinked by techniques well known to a person skilled in the art, in particular by the peroxide route.

The peroxide route is tending to be increasingly avoided with respect to the decomposition products of peroxide, which exhibit disadvantages during the manufacture of the cable, indeed even once the cable is in the operational configuration. This is because, during the crosslinking, the peroxides decompose and form crosslinking by-products, such as, in particular, methane, acetophenone, cumyl alcohol, acetone, tert-butanol, α-methylstyrene and/or water. The formation of water from cumyl alcohol is relatively slow and can occur after several months, indeed even a few years, once the cable is in the operational configuration. The risk of breakdown of the crosslinked layers is thus significantly increased. In addition, if the methane formed during the crosslinking stage is not discharged from the crosslinked layers, risks related to the explosiveness of methane and its ability to ignite cannot be ignored. This gas can also cause damage once the cable is put into service. Even if solutions exist for limiting the presence of methane within the cable, such as, for example, heat treating the cable in order to accelerate the diffusion of methane outside the cable, they become lengthy and expensive when the thickness of the crosslinked layers is high.

The document U.S. Pat. No. 4,826,726 is known, which describes a heat-resistant electrical conductor surrounded by a crosslinked layer obtained from a composition comprising an ethylenic copolymer comprising an oxirane functional group and a polymeric compound, as crosslinking agent, of the copolymer of ethylene and of unsaturated dicarboxylic acid anhydride type.

The aim of the present invention is to overcome the disadvantages of the techniques of the prior art by providing an electrical device, of the electric cable or electric cable accessory type, comprising a crosslinked layer, the manufacture of which significantly limits the presence of crosslinking by-products, such as, for example, methane and/or water, while guaranteeing optimum thermomechanical properties, such as hot creep, characteristics of the good crosslinking of said layer, and in particular a significantly improved resistance to electrical breakdown.

A subject matter of the present invention is an electrical device comprising a crosslinked layer obtained from a polymer composition comprising at least one polymer comprising at least one epoxy functional group, characterized in that the polymer composition additionally comprises a non-polymeric compound as crosslinking agent comprising at least one reactive functional group capable of reacting with the epoxy functional group of said polymer in order to make possible the crosslinking of said polymer.

By virtue of the invention, the crosslinked layer makes it possible to avoid the use of organic peroxide while guaranteeing a high level of crosslinking.

In addition, the crosslinked layer of the invention exhibits the advantage of being economical, easy to process, in particular by extrusion, and to manufacture since it does not require resorting to restrictive venting processes.

According to a first embodiment, the device according to the invention is an electric cable comprising an elongated electrically conducting component surrounded by said crosslinked layer.

According to a second embodiment, the device according to the invention is an electric cable accessory, said accessory comprising said crosslinked layer. Said accessory is more particularly intended to be used in combination with at least one electric cable, said crosslinked layer being intended to surround at least one end of an electric cable. The accessory can in particular be an electric cable joint or termination.

The epoxy functional group (i.e., the epoxide functional group) of the polymer is more particularly an oxirane functional group (i.e., an ethylene oxide group).

Preferably, the epoxy functional group can be contributed by a compound comprising said epoxy functional group, it being possible for this compound to be chosen from glycidyl esters. Thus, the polymer of the invention can comprise glycidyl ester groups.

The polymer of the invention can comprise at most 10% by weight of epoxy functional group and preferably at most 5% by weight of epoxy functional group.

The polymer of the invention can comprise at least 0.1% by weight of epoxy functional group and preferably at least 1% by weight of epoxy functional group.

According to a first alternative form, the epoxy functional group can be grafted to the polymer. The polymer comprising at least one epoxy functional group of the invention is, according to this first alternative form, an epoxy-grafted polymer. In other words, the polymer according to the invention can be a polymer comprising at least one epoxy functional group grafted to the macromolecular chain (i.e., main chain or backbone) of said polymer. The ends of the macromolecular chain of the polymer may or may not for their part be grafted with the epoxy functional group.

According to a second alternative form, the polymer comprising at least one epoxy functional group of the invention can be a copolymer obtained from at least two monomers, one of the two monomers comprising said epoxy functional group. Said monomer comprising said epoxy functional group can be chosen from the following compounds: butenecarboxylic acid monoglycidyl ester, glycidyl methacrylate, glycidyl acrylate, methylglycidyl acrylate, methylglycidyl methacrylate, itaconic acid glycidyl ester, 7,8-epoxy-1-octyl methacrylate, itaconic acid methylglycidyl ester, 7,8-epoxy-1-octyl vinyl ether, vinyl glycidyl ether, allyl glycidyl ether and 2-methyl-2-propenyl glycidyl ether.

Mention may be made, by way of example, as polymer comprising at least one epoxy functional group, of a copolymer of ethylene and glycidyl methacrylate.

The polymer of the invention is more particularly an organic polymer, making it possible in particular to shape the polymer composition by extrusion.

The polymer can comprise at least one polyolefin. The term "polyolefin" as such means generally olefin polymer of the olefin homopolymer or copolymer type. Preferably, said olefin polymer is a noncyclic olefin polymer.

In the present invention, it will be preferable to use an ethylene polymer (ethylene homo- or copolymer) or a propylene polymer (propylene homo- or copolymer).

The first alternative form of the invention can be used with an epoxy-grafted olefin homopolymer or an epoxy-grafted olefin copolymer.

The second alternative form of the invention can be used with a copolymer obtained from an olefin monomer and a monomer comprising at least one epoxy functional group, as described above.

The polymer composition of the invention can comprise more than 50.0 parts by weight of polymer comprising at least one epoxy functional group per 100 parts by weight of polymer(s) (i.e., polymer matrix) in the polymer composition; preferably at least 70 parts by weight of polymer comprising at least one epoxy functional group per 100 parts by weight of polymer(s) in said polymer composition; and particularly preferably at least 90 parts by weight of polymer comprising at least one epoxy functional group per 100 parts by weight of polymer(s) in said polymer composition.

Particularly advantageously, the constituent polymer or polymers of the polymer composition are solely one or more olefin-based polymer(s) (i.e., olefin homopolymer and/or copolymer).

In a specific embodiment, the polymer of the invention can additionally comprise at least one acrylate functional group. This acrylate functional group advantageously makes it possible to render the polymer of the invention supple and more flexible.

According to a first alternative form, the acrylate functional group can be grafted to the polymer of the invention. The polymer of the invention is, according to this first alternative form, an acrylate-grafted polymer. In other words, the polymer according to the invention can be a polymer comprising at least one acrylate functional group grafted to the macromolecular chain (i.e., main chain or backbone) of said polymer. The ends of the macromolecular chain of the polymer may or may not, for their part, be grafted with the acrylate functional group.

According to a second alternative form, the polymer of the invention can be a copolymer obtained from at least two monomers, one of the two monomers comprising said acrylate functional group. Mention may be made, by way of example, of the terpolymer of ethylene, methyl acrylate and glycidyl methacrylate.

The nonpolymeric compound of the invention (i.e., crosslinking agent) is an organic compound other than a polymer. In other words, the crosslinking agent does not in particular result from the covalent linking of a large number of identical or different monomer units. More particularly, the crosslinking agent does not result from the covalent linking of at least two identical or different monomer units.

The reactive functional group(s) of the nonpolymeric compound is/are capable of reacting with the epoxy functional group of the said polymer in order to make possible the crosslinking of said polymer. It will react directly or indirectly with the epoxy functional group after opening the epoxy during a rise in temperature.

The reactive functional group of the nonpolymeric compound can be chosen from an anhydride functional group, a carboxyl functional group and an amine functional group.

More particularly, the crosslinking agent can advantageously be chosen from:
 a nonpolymeric compound comprising at least one amine functional group and at least one carboxyl functional group,
 a nonpolymeric compound comprising at least one anhydride functional group in combination with a crosslinking catalyst, and
 one of their mixtures.

This is because these two types of crosslinking agent make it possible to obtain crosslink layers with low amounts of crosslinking agent, while guaranteeing a very good resistance to breakdown according to French standard IEC 62539 or a very good electrical resistivity according to French standard IEC 60840, and a relatively low crosslinking temperature of the polymer composition (in particular of less than 300° C. and preferably of less than or equal to 250° C.), in order to limit the degradation of the polymer comprising epoxy functional group.

When the nonpolymeric compound comprises at least one amine functional group, the amine functional group is a primary or secondary amine.

In a specific embodiment, the nonpolymeric compound can comprise at least two reactive functional groups. These at least two reactive functional groups can be identical or different and can be chosen without distinction from an anhydride functional group, a carboxyl functional group and an amine functional group. Preferably, the nonpolymeric compound can comprise two different reactive functional groups.

According to a first preferred embodiment of the invention, the nonpolymeric compound can comprise an amine functional group and a carboxyl functional group. By way of example, the nonpolymeric compound is an amino acid.

The amino acids thus comprise two functional groups: the carboxyl —COOH functional group and the amine functional group, which is preferably of the primary amine —$NH_2$ type.

The carbon chain separating the carboxyl functional group from the amine functional group can comprise from 1 to 50 carbon atoms and preferably from 1 to 20 carbon atoms.

Conventionally, the carboxyl and amine functional groups can be positioned at the ends of the main carbon chain of said amino acid, the main carbon chain preferably being an unbranched chain.

Mention may be made, by way of example, of 11-aminoundecanoic acid.

The amino acid can also be an α-amino acid, which is defined by the fact that the amine functional group is bonded to the carbon atom adjacent to the carboxyl functional group (the α carbon).

According to a second preferred embodiment of the invention, the nonpolymeric compound can comprise at least one anhydride functional group. In this case, when the crosslinking agent is a nonpolymeric compound comprising an anhydride functional group, the composition additionally comprises a crosslinking catalyst or, in other words, said nonpolymeric compound comprising an anhydride functional group is combined, in the polymer composition, with a crosslinking catalyst.

The nonpolymeric compound comprising an anhydride functional group is more particularly an organic compound. In other words, the nonpolymeric compound comprising an anhydride functional group is composed solely of carbon and of hydrogen and optionally of oxygen.

More particularly, said nonpolymeric compound comprising an anhydride functional group additionally comprises an aliphatic chain comprising at least five carbon atoms, it being possible for this chain to be saturated or unsaturated.

Mention may be made, by way of example, of dodecenylsuccinic anhydride.

The polymer composition in accordance with the invention can comprise an amount of crosslinking agent in an amount necessary and sufficient to obtain the crosslinked layer.

By way of example, the polymer composition can comprise at most 15.0 parts by weight of crosslinking agent per 100 parts by weight of polymer(s), preferably at most 10.0 parts by weight of crosslinking agent per 100 parts by weight of polymer(s) and preferably at most 5.0 parts by weight of crosslinking agent per 100 parts by weight of polymer(s).

The polymer composition in accordance with the invention can comprise at least 0.1 part by weight of crosslinking agent per 100 parts by weight of polymer(s) and preferably at least 0.5 part by weight of crosslinking agent per 100 parts by weight of polymer(s).

The polymer composition of the invention can additionally comprise a filler.

The filler of the invention can be an inorganic or organic filler. It can be chosen from a flame-retardant filler and an inert filler (or noncombustible filler).

By way of example, the flame-retardant filler can be a hydrated filler chosen in particular from metal hydroxides, such as, for example, magnesium dihydroxide (MDH) or aluminum trihydroxide (ATH). These flame-retardant fillers act mainly by the physical route by decomposing endothermically (e.g., release of water), which has the consequence of lowering the temperature of the crosslinked layer and of limiting the propagation of the flames along the electrical device. The term "flame retardant properties" is used in particular.

For its part, the inert filler can be chalk, talc, clay (e.g., kaolin) or carbon black.

Carbon black may be preferred in order to obtain a semiconducting crosslinked layer and may be introduced into the polymer composition in an amount sufficient to render the composition semiconducting.

The polymer composition can comprise at least 20 parts by weight of fillers per 100 parts by weight of polymer in the composition, preferably at least 30 parts by weight of filler per 100 parts by weight of polymer in the composition and more preferably still at least 40 parts by weight of filler per 100 parts by weight of polymer in the composition.

The addition of a filler as described in the invention can result in a rise in temperature during the processing of the polymer composition and for this reason bring about premature crosslinking of the polymer composition. Thus, in order to prevent any premature crosslinking of the polymer composition, it is preferable for the addition of the filler to be carried out so that there is no premature crosslinking of the polymer composition during its processing. More particularly, the crosslinking agent can advantageously be added to the polymer composition in a stage separate from and subsequent to that of the addition of the filler.

According to another characteristic of the invention and in order to guarantee an "HFFR" (Halogen-Free Flame Retardant) electrical device, the electrical device, or in other words the components which make up said electrical device, preferably does/do not comprise halogenated compounds. These halogenated compounds can be of any nature, such as, for example, fluoropolymers or chloropolymers, such as polyvinyl chloride (PVC), halogenated plasticizers, halogenated inorganic fillers, and the like.

The polymer composition can typically additionally comprise additives in an amount of 5 to 20 parts by weight per 100 parts by weight of polymer in the composition. The additives are well known to a person skilled in the art and can, for example, be chosen from protective agents (antioxidants, UV stabilizers, agents for combating copper), processing aids (plasticizers or viscosity reducers) and pigments.

As mentioned above, the polymer composition can also comprise a crosslinking catalyst in order to help in the crosslinking. This crosslinking catalyst can more particularly be used when the nonpolymeric crosslinking agent of the invention comprises a reactive functional group of the anhydride type.

The crosslinking catalyst can be a catalyst of the Lewis base type or, in other words, a nucleophilic chemical entity, one of the constituents of which has a pair or more of free or nonbonding electrons on its valence layer.

By way of examples, the crosslinking catalyst can be chosen from imides, tertiary amines, imidazoles and one of their mixtures.

Crosslinking catalysts of phenol type would be preferred in the context of the invention, this catalyst being in particular a Lewis base, such as, for example, 2,4,6-tris(dimethylaminoethyl)phenol.

When the polymer composition comprises a crosslinking catalyst, in particular in the presence of a nonpolymeric crosslinking agent comprising a reactive functional group of the anhydride type, the polymer composition can comprise from 0.01 to 2.0 parts by weight of crosslinking catalyst per 100 parts by weight of polymer and preferably from 0.05 to 1.0 part by weight of crosslinking catalyst per 100 parts by weight of polymer.

In the present invention, the crosslinked layer can be easily characterized by the determination of its gel content according to the standard ASTM D 2765-01. More particularly, said crosslinked layer can advantageously have a gel content, according to the standard ASTM D 2765-01, of at least 40%, preferably of at least 50%, preferably of at least 60% and particularly preferably of at least 70%.

The crosslinked layer can also be characterized by French standard NF EN 60811-2-1 (or hot set test) with a hot creep under load (elongation as a percentage) of at most 175%.

According to a first embodiment, the crosslinked layer of the invention can be an electrically insulating layer. The crosslinked layer of this first embodiment in addition advantageously exhibits a significantly improved resistance to electrical breakdown.

More particularly, "electrically insulating layer" is understood to mean a layer, the electrical conductivity of which can be at most $1.10^{-9}$ S/m (siemens per meter) (at 25° C.).

When the electrical device of the invention is an electric cable, at least two alternative forms of this first embodiment are possible.

According to a first alternative form of the first embodiment, the crosslinked layer of the invention is directly in physical contact with the elongated electrically conducting component. Reference is made, in this case, in particular to low-voltage cable.

The polymer composition used to form the low-voltage cable preferably comprises at least one filler, as defined above in the invention.

In addition, the polymer of the invention can advantageously comprise said acrylate functional group.

According to a second alternative form of the first embodiment, the electric cable of the invention additionally comprises a first semiconducting layer and a second semiconducting layer, the first semiconducting layer surrounding the elongated electrically conducting component, the electrically insulating layer surrounding the first semiconducting layer and the second semiconducting layer surrounding the electrically insulating layer. Reference is made, in this case, in particular to medium- or high-voltage cable.

The polymer composition used to form the medium- or high-voltage cable preferably does not comprise filler. In addition, the polymer of the invention can advantageously not comprise said acrylate functional group.

According to a second embodiment, the crosslinked layer of the invention can be a semiconducting layer. Consequently, the polymer composition of the invention can additionally comprise an electrically conducting filler in an amount sufficient to render the polymer composition semiconducting. Mention may be made, for example, as electrically conducting filler, of carbon black.

More particularly, "semiconducting layer" is understood to mean a layer, the electrical conductivity of which can be at least $1.10^{-9}$ S/m (siemens per meter), preferably at least $1.10^{-3}$ S/m, and preferably can be less than $1.10^{3}$ S/m (at 25° C.).

When the electrical device of the invention is an electric cable, the latter can comprise a first semiconducting layer surrounding the elongated electrically conducting component, an electrically insulating layer surrounding the first semiconducting layer and a second semiconducting layer surrounding the electrically insulating layer, the crosslinked layer of the invention being at least one of these three layers, preferably at least two of said three layers and preferably said three layers. Reference is made, in this case, in particular to medium- or high-voltage cable.

In the present invention, the elongated electrically conducting component of the electric cable can be a metal wire or a plurality of metal wires, which is/are or is/are not twisted, in particular made of copper or of aluminum, or one of their alloys.

When the electrical device of the invention is an electric cable accessory, said accessory more particularly surrounds at least one end of an electric cable, said end being that which is intended to be combined with said accessory.

The accessory can typically be a hollow longitudinal body, such as, for example, an electric cable joint or termination, in which at least a portion of an electric cable is intended to be positioned.

The accessory comprises at least one semiconducting component and at least one electrically insulating component, these components being intended to surround an end of an electric cable. The semiconducting component is well known for controlling the geometry of the electric field, when the electric cable, in combination with said accessory, is under voltage.

The crosslinked layer of the invention can be said semiconducting component and/or said electrically insulating component.

When the accessory is a joint, the latter makes it possible to connect together two electric cables, the joint then surrounding, in part, these two electric cables. More particularly, the end of each electric cable intended to be connected is positioned inside said joint.

When the device of the invention is an electric cable termination, the latter surrounds, in part, an electric cable. More particularly, the end of the electric cable intended to be connected is positioned inside said termination.

The crosslinked layer of the invention can be a layer extruded or a layer molded by processes well known to a person skilled in the art. When the electrical device is an electric cable, the crosslinked layer is preferably an extruded layer. When the electrical device is an electric cable accessory, the crosslinked layer is preferably a molded layer.

Another subject matter of the invention is a process for the manufacture of an electrical device of the electric cable type according to the invention, characterized in that it comprises the following stages:

i. extruding the polymer composition around an elongated electrically conducting component, in order to obtain an extruded layer, and ii. crosslinking the extruded layer of stage i.

Stage i can be carried out by techniques well known to a person skilled in the art, using an extruder.

During stage i, the temperature within the extruder should preferably not exceed the temperature of opening of the epoxy functional group with the polymer, in order to prevent any crosslinking within the extruder. By way of example, the temperature for processing the polymer composition by extrusion is less than 200° C. and preferably less than 150° C.

There is thus obtained, at the extruder outlet, a layer extruded around said electrically conducting component which may or may not be directly in physical contact with said electrically conducting component.

At the extruder outlet, the extruded layer is thus a "noncrosslinked" layer.

"Noncrosslinked" is understood to mean a layer, the gel content of which according to the standard ASTM D 2765-01 is at most 20%, preferably at least 10%, preferably at least 5%, and particularly preferably 0%.

Prior to stage i, the constituent components of the polymer composition of the invention can be mixed, in particular with the polymer in the molten state, in order to obtain a homogeneous mixture. The temperature within the mixer can be sufficient to obtain a polymer in the molten state but is limited in order to prevent the crosslinking of the polymer.

The homogeneous mixture is then granulated by techniques well known to a person skilled in the art. These granules can subsequently feed an extruder in order to carry out stage i.

Stage ii can be carried out by the thermal route, for example using a steam tube or a bath of molten salt, these techniques being well known to a person skilled in the art. By way of example, the crosslinking temperature is less than 300° C. and preferably less than or equal to 250° C.

At the extruder outlet, the composition extruded in the form of a layer around the electrically conducting component can subsequently be subjected to a temperature sufficient in order to be able to open the epoxy functional group of the polymer and thus to cause the crosslinking agent to react with the opened epoxy functional group. An extruded and crosslinked layer is then obtained.

BRIEF DESCRIPTION OF THE DRAWINGS

Other characteristics and advantages of the present invention will become apparent in the light of the description of a nonlimiting example of an electric cable according to the invention made with reference to the figures.

DETAILED DESCRIPTION

For reasons of clarity, only the components essential for the understanding of the invention have been represented diagrammatically, this being done without observing a scale.

Figure 1:
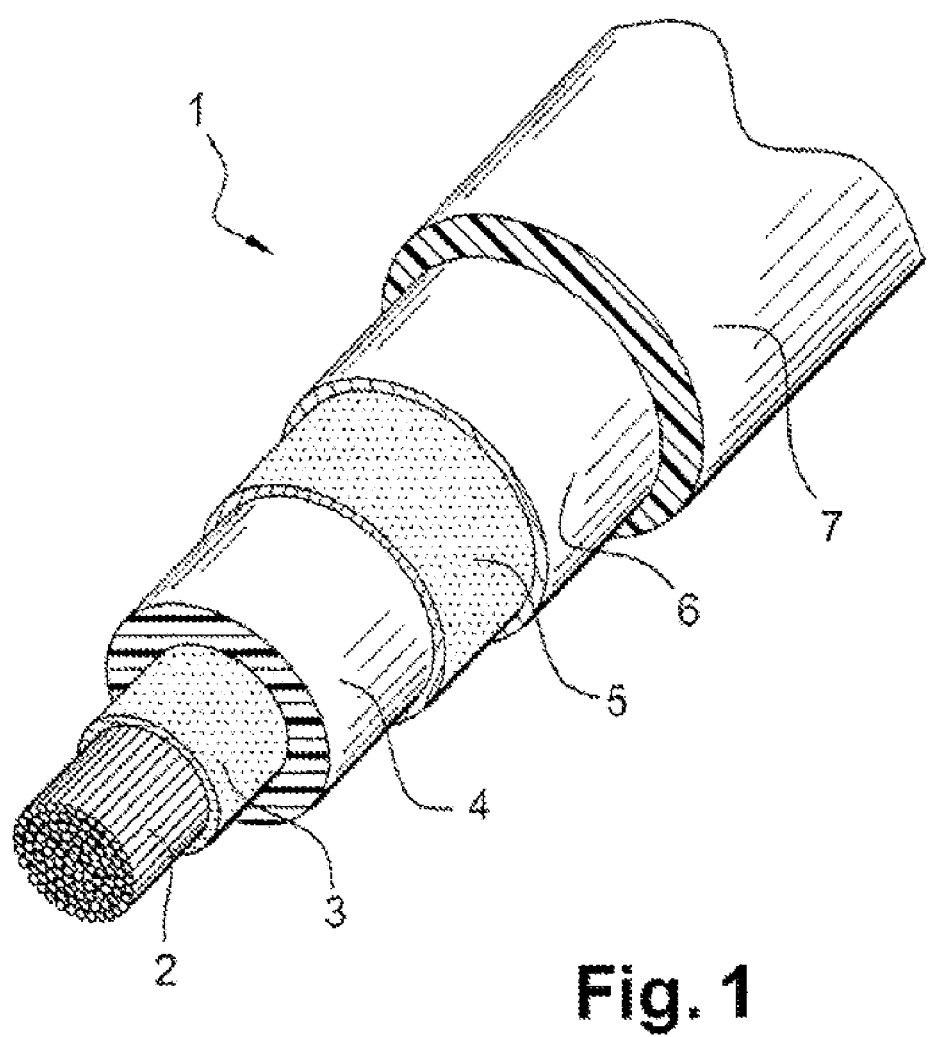
FIG. 1 represents a diagrammatic view in cross section of an electric cable according to a preferred embodiment in accordance with the invention.

The medium- or high-voltage power cable 1, illustrated in FIG. 1, comprises an elongated central conducting component 2, in particular made of copper or of aluminum. The power cable 1 additionally comprises several layers positioned successively and coaxially around this conducting component 2, namely: a first semiconducting layer 3 referred to as "inner semiconducting layer", an electrically insulating layer 4, a second semiconducting layer 5 referred to as "outer semiconducting layer", an earthing and/or protective metal shield 6 and an external protective cladding 7.

The electrically insulating layer 4 is an extruded and crosslinked layer obtained from the polymer composition according to the invention.

The semiconducting layers are also extruded and crosslinked layers which can be obtained from the polymer composition according to the invention.

The presence of the metal shield 6 and of the external protective cladding 7 is preferential but not essential, this cable structure being as such well known to a person skilled in the art.

Figure 2:
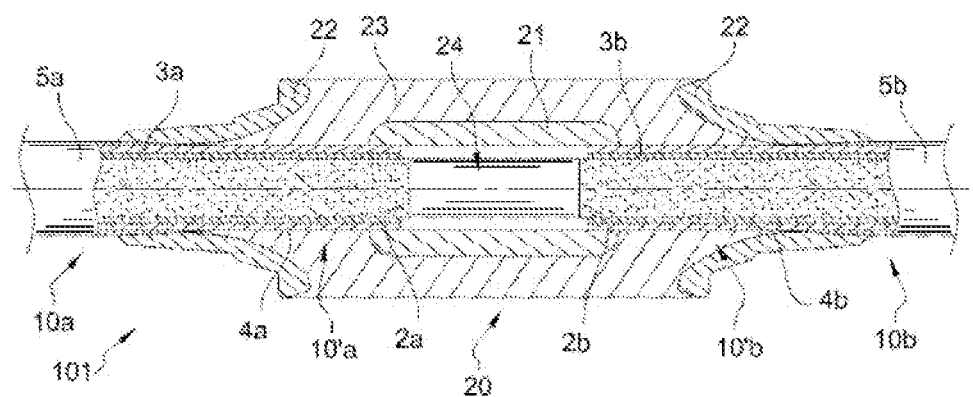
FIG. 2 represents a diagrammatic view of a device according to the invention comprising a joint in longitudinal section, this joint surrounding the end of two electric cables.

FIG. 2 represents a device 101 comprising a joint 20 surrounding, in part, two electric cables 10a and 10b.

More particularly, the electric cables 10a and 10b respectively comprise an end 10'a and 10'b which are intended to be surrounded by the joint 20.

The body of the joint 20 comprises a first semiconducting component 21 and a second semiconducting component 22 separated by an electrically insulating component 23, said semiconducting components 21, 22 and said electrically insulating component 23 surrounding the ends 10'a and 10'b respectively of the electric cables 10a and 10b.

This joint 20 makes it possible to electrically connect the first cable 10a to the second cable 10b, in particular by virtue of an electrical connector 24 positioned at the center of the joint 20.

At least one of the components chosen from the first semiconducting component 21, the second semiconducting component 22 and said electrically insulating component 23 can be a crosslinked layer as described in the invention.

The first electric cable 10a comprises an electrical conductor 2a surrounded by a first semiconducting layer 3a, an electrically insulating layer 4a surrounding the first semiconducting layer 3a, and a second semiconducting layer 5a surrounding the electrically insulating layer 4a.

The second electric cable 10b comprises an electrical conductor 2b surrounded by at least one first semiconducting layer 3b, an electrically insulating layer 4b surrounding the first semiconducting layer 3b, and a second semiconducting layer 5b surrounding the electrically insulating layer 4b.

These electric cables 10a and 10b can be those described in the present invention.

At said end 10'a, 10'b of each electric cable 10a, 10b, the second semiconducting layer 5a, 5b is at least partially denuded in order for the electrically insulating layer 4a, 4b to be at least partially positioned inside the joint 20, without being covered with the second semiconducting layer 5a, 5b of the cable.

Inside the joint 20, the electrically insulating layers 4a, 4b are directly in physical contact with the electrically insulating component 23 and the first semiconducting component 21 of the joint 20. The second semiconducting layers 5a, 5b are directly in physical contact with the second semiconducting component 22 of the joint 20.

Figure 3:
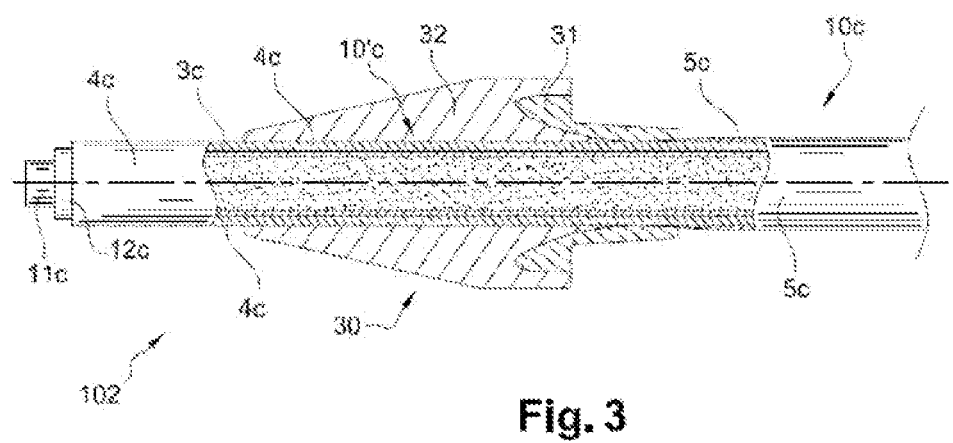
FIG. 3 represents a diagrammatic view of a device according to a first alternative form of the invention comprising a termination in longitudinal section, this termination surrounding the end of a single electric cable.

FIG. 3 represents a device 102 comprising a termination 30 surrounding a single electric cable 10c.

More particularly, the electric cable 10c comprises an end 10'c intended to be surrounded by the termination 30.

The body of the termination 30 comprises a semiconducting component 31 and an electrically insulating component 32, said semiconducting component 31 and said electrically insulating component 32 surrounding the end 10'c of the electric cable 10c.

At least one of the components chosen from the semiconducting component 31 and the electrically insulating component 32 can be a crosslinked layer as described in the invention.

The electric cable 10c comprises an electrical conductor 2c surrounded by a first semiconducting layer 3c, an electrically insulating layer 4c surrounding the first semiconducting layer 3c, and a second semiconducting layer 5c surrounding the electrically insulating layer 4c.

This electric cable 10c can be that described in the present invention.

At said end 10'c of the electric cable 10c, the second semiconducting layer 5c is at least partially denuded in order for the electrically insulating layer 4c to be at least partially positioned inside the termination 30, without being covered with the second semiconducting layer 5c of the cable.

Inside the termination 30, the electrically insulating layer 4c is directly in physical contact with the electrically insulating component 32 of the termination 30. The second semiconducting layer 5c is directly in physical contact with the semiconducting component 31 of the joint 30.

EXAMPLES

1. Filler-free Electrically Insulating Compositions

Filler-free crosslinkable compositions, the amounts of the compounds of which are expressed in parts by weight per 100 parts by weight of polymer, are collated in table 1 below. Compositions I10 and I20 are in accordance with the invention.

TABLE 1

| Composition | C10 | C20 | C30 | C40 | I10 | I20 |
|---|---|---|---|---|---|---|
| Polymer/Epoxy | 60 | 100 | 100 | 100 | 100 | 100 |
| Terpolymer | 40 | 0 | 0 | 0 | 0 | 0 |

TABLE 1-continued

| Composition | C10 | C20 | C30 | C40 | I10 | I20 |
|---|---|---|---|---|---|---|
| Bronsted acid | 0 | 0.75 | 0 | 0 | 0 | 0 |
| Lewis acid | 0 | 0 | 0.75 | 0 | 0 | 0 |
| Anhydride | 0 | 0 | 0 | 3.75 | 0 | 3.75 |
| Amino acid | 0 | 0 | 0 | 0 | 0.75 | 0 |
| Catalyst | 0 | 0 | 0 | 0 | 0 | 0.12 |

The compounds of table 1 have the following origins:
Polymer/Epoxy is a copolymer of ethylene and glycidyl methacrylate (GMA) sold by Arkema under the reference Lotader AX8840, this copolymer comprising 8% by weight of GMA;
Terpolymer is a terpolymer of ethylene, methyl acrylate and maleic anhydride sold by Arkema under the reference Lotader 3430;
Bronsted acid is a 4-methylbenzenesulfonic acid sold by Sigma-Aldrich under the reference 4-methylbenzenesulfonic acid;
Lewis acid is a copper(II) acetylacetonate sold by Sigma-Aldrich under the reference copper(II) acetylacetonate;
Anhydride is a dodecenylsuccinic anhydride sold by Sigma-Aldrich under the reference dodecenylsuccinic anhydride;
Amino acid is an 11-aminoundecanoic acid sold by Sigma-Aldrich under the reference 11-Aminoundecanoic acid; and
Catalyst is the phenolic catalyst 2,4,6-tris(dimethylaminoethyl)phenol sold by Sigma-Aldrich under the reference 2,4,6-tris(dimethylaminoethyl)phenol.

In table 1, the terpolymer, the Bronsted acid, the Lewis acid, the anhydride and the amino acid are used as crosslinking agent.

The compositions collated in table 1 are processed as follows.

In a first step, for each composition (C10 to C40, I10 and I20), the crosslinking agent is mixed with the polymer in the molten state in an internal mixer of twin-screw or Buss type, the temperature within the mixer not exceeding 130° C. in order to prevent the crosslinking of the polymer. The homogeneous mixture thus obtained is subsequently granulated.

In a second step, the granules are subsequently introduced into a single-screw extruder and extruded at a maximum temperature of 130° C., in order to prevent any crosslinking of the polymer in the extruder.

The extrusion is carried out around a copper conducting wire with a section of 1.5 mm². An electric cable comprising an extruded and noncrosslinked layer in direct contact with the conducting wire is obtained.

In a third step, the extruded layer is crosslinked by supplying heat, at a temperature of 200° C., said electric cable being passed inside a steam tube under a steam pressure of 15 bar.

2. Filler-comprising Electrically Insulating Compositions

Filler-comprising crosslinkable compositions, the amounts of the compounds of which are expressed in parts by weight by 100 parts of polymer, are collated in table 2 below. Composition I30 is in accordance with the invention.

TABLE 2

| Composition | C50 | I30 |
|---|---|---|
| PEO | 50 | 0 |
| EPDM | 50 | 0 |
| Peroxide | 8 | 0 |

TABLE 2-continued

| Composition | C50 | I30 |
|---|---|---|
| Cocrosslinking agent | 4 | 0 |
| Polymer/Epoxy | 0 | 100 |
| Amino acid | 0 | 0.75 |
| Kaolin | 40 | 40 |

The compounds of table 2 have the following origins:
PEO is a copolymer of ethylene and octene sold by Dow Chemicals under the reference Engage;
EPDM is an ethylene/propylene/diene monomer copolymer sold by ExxonMobil under the reference Vistalon;
Peroxide is a dicumyl peroxide sold by Arkema under the reference Luperox DC40P;
Cocrosslinking agent is triallyl cyanurate sold by Evonik;
Polymer/Epoxy is a copolymer of ethylene and glycidyl methacrylate (GMA) sold by Arkema under the reference Lotader AX8840, this copolymer comprising 8% by weight of GMA;
Amino acid is an 11-aminoundecanoic acid sold by Sigma-Aldrich under the reference 11-Aminoundecanoic acid;
Kaolin is kaolin sold by Imerys under the reference Polestar 501.

Composition C50 of table 2 is processed as follows.

In a first step, all the constituents of composition C50, except for the peroxide and the cocrosslinking agent, the PEO being in the molten state, are mixed in an internal mixer of twin-screw or Buss type.

The mixture is subsequently cooled, using a roll mill, to a temperature lower than the decomposition temperature of the peroxide (i.e., temperature of less than 160° C.). The peroxide and the cocrosslinking agent are then introduced into the roll mill in order to continue the homogenization. The homogeneous mixture thus obtained is subsequently granulated.

In a second step, the granules are subsequently introduced into a single-screw extruder and extruded at a maximum temperature of 130° C., in order to prevent any decomposition of the peroxide and thus any crosslinking of the polymer in the extruder.

The extrusion is carried out around a copper conducting wire with a section of 1.5 mm². An electric cable comprising an extruded and noncrosslinked layer in direct contact with the conducting wire is obtained.

In a third step, the extruded layer is crosslinked by supplying heat, at a temperature of 200° C., said electric cable being passed inside a steam tube under a pressure of 15 bar.

Composition I30 of table 2 is processed according to the same procedure as that described for the compositions of table 1, except for the fact that the kaolin is added in addition to the amino acid (cf. crosslinking agent) with the molten polymer to the internal mixer, care being taken that the temperature of the mixture does not exceed 130° C. Following this passage in the internal mixer and in order to remain under similar operating conditions to those of the mixer C50, the mixer I30 is passed over a roll mill.

3. Semiconducting Compositions

Crosslinkable semiconducting compositions, the amounts of the compounds of which are expressed in parts by weight per 100 parts of polymer, are collated in table 3 below. Composition I40 is in accordance with the invention.

TABLE 3

| Composition | I40 |
|---|---|
| Polymer/Epoxy | 100 |
| Amino acid | 0.38 |
| Antioxidants | 1.5 |
| Carbon black | 42.9 |

The compounds of table 3 have the following origins:
Polymer/Epoxy is a copolymer of ethylene and glycidyl methacrylate (GMA) sold by Arkema under the reference Lotader AX8840, this copolymer comprising 8% by weight of GMA;
Amino acid is an 11-aminoundecanoic acid sold by Sigma-Aldrich under the reference 11-Aminoundecanoic acid;
Antioxidants is a mixture of 0.5 part by weight of Irganox PS802 and of 1.0 part by weight of Irganox 1035, these antioxidants being sold by BASF; and
Carbon black is carbon black sold by Cabot under the reference Carbon Black VXC500.

Composition I40 in table 3 is processed according to the same procedure as that described for the compositions of table 1, except that the amino acid is added after the carbon black. More particularly, in the first stage, all the constituents of composition I40, except for the amino acid, are mixed in the internal mixer. The mixture is subsequently cooled using a roll mill down to a temperature of less than 130° C. in order to be able finally to add the amino acid.

4. Characterization of the Compositions

Tests of hot creep under load, of resistance to breakdown and of electrical resistivity were carried out on crosslinked plaques starting from the compositions of tables 1, 2 and 3.

On this account, the constituents of the different polymer compositions were mixed in an internal mixer of Brabender or Haake type, with the polymer in the molten state. The mixture was then placed in a mold compressed at a temperature of 120° C. for 5 minutes under a pressure of 6 tonnes with spacers of different sizes in order to manufacture preforms as a function of the type of test specimens necessary. The crosslinking of the preforms is then carried out under a press at a temperature of 200° C. for 12 minutes under a pressure of 10 tonnes. The crosslinked plaques thus obtained have a thickness of 0.8-1 mm for the hot creep and electrical resistivity tests and of 100±5 μm for the tests of resistance to breakdown.

4.1. Test of Hot Creep Under Load

French standard NF EN 60811-2-1 describes the measurement of the hot creep of a material under load. The corresponding test is commonly denoted hot set test.

It consists in practical terms in weighing down one end of a material test specimen with a weight corresponding to the application of a stress equivalent to 0.2 MPa and then placing the assembly in an oven heated at 200+/−1° C. for a period of time of 15 minutes. At the end of this period of time, the hot elongation under load of the test specimen, expressed in %, is recorded. The suspended weight is then removed and the test specimen is maintained in the oven for a further 5 minutes. The remaining permanent elongation, also known as set, is then measured before being expressed in %.

It should be remembered that the more crosslinked the material, the lower the elongation and set values. It is furthermore specified that, if a test specimen were to break during the test, under the joint action of the mechanical stress and the temperature, the result of the test would then logically be regarded as a failure.

The results of the test of hot creep under load are collated in the following table 4:

TABLE 4

| Composition | Elongation-Hot creep (%) | Set-Hot creep (%) |
|---|---|---|
| C10 | 40 | 5 |
| C20 | Breaking | Breaking |
| C30 | Breaking | Breaking |
| C40 | Breaking | Breaking |
| C50 | 15 | 0 |
| I10 | 75 | 10 |
| I20 | 75 | 10 |
| I30 | 25 | 0 |
| I40 | 30 | 0 |

From the viewpoint of the results collated in table 4, the polymer compositions of the invention (I10 to I40), once crosslinked, all exhibit a hot elongation under load of less than 100% and in particular of less than or equal to 75%.

4.2. Test of Resistance to Breakdown

The standard used to determine the resistance to electrical breakdown at 20° C. of the crosslinked materials obtained from the compositions of tables 1 and 2 is French standard IEC 62539, based on the Weibull distribution.

Figure 4:
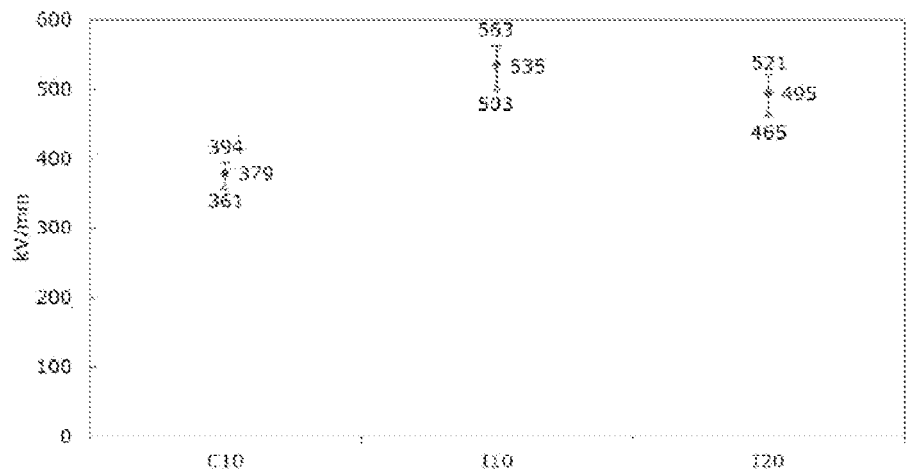
FIG. 4 shows the values of resistance to breakdown for different types of crosslinking agent, for filler-free polymer compositions.
Figure 5:
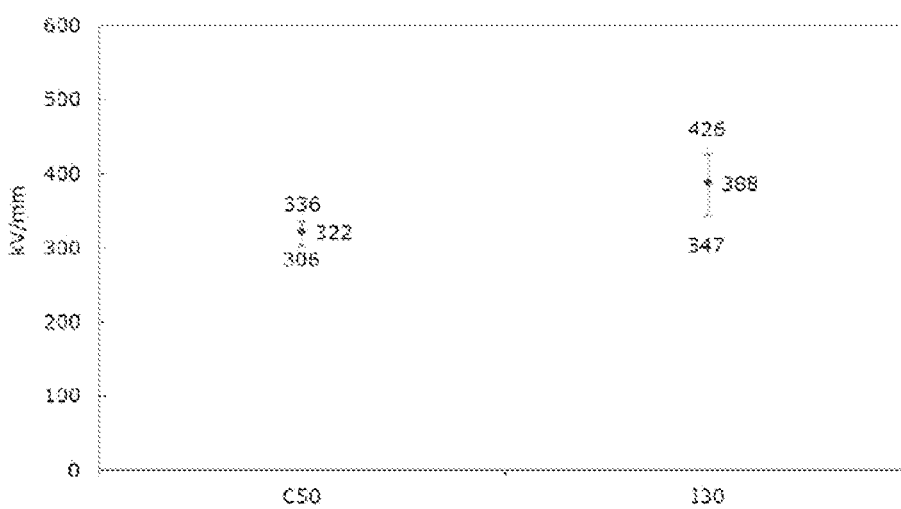
FIG. 5 shows the values of resistance to breakdown for different types of crosslinking agent, for filler-comprising polymer compositions.

The results are collated in FIGS. 4 and 5. The test of resistance to breakdown was only carried out on the crosslinked materials which had passed the hot set test according to French standard NF EN 60811-2-1 (i.e., compositions C10, C50, I10, I20 and I30). The values of resistance to breakdown in kV/mm, obtained by the Weibull method and represented in these FIGS. 4 and 5 by the diamond-shaped symbol, are delimited by minimum values (cf. triangle-shaped symbol) and maximum values (cf. square-shaped symbol) indicating a 95% confidence interval.

It is noticed, in these figures, that the resistance to direct current breakdown is:
markedly improved for the filler-free compositions I10 and I20 according to the invention (respectively 535 and 495 kV/mm), with respect to the filler-free composition C10 (379 kV/mm);
markedly improved for the filler-comprising composition according to the invention I30 (388 kV/mm), with respect to the filler-comprising composition C50 (322 kV/mm).

Consequently, a crosslinked layer according to the invention advantageously makes it possible to improve the electrical resistance to breakdowns of said layer.

4.3. Electrical Resistivity Test

The standard used to determine the electrical resistivity of the crosslinked material obtained from the composition of table 3 is French standard IEC 60840.

The electrical resistivity of the crosslinked semiconducting layer obtained from composition I40 is 50 Ω·m (ohm·meter), which corresponds to an electrical resistivity value which is entirely satisfactory with respect to the conventional field of electrical resistivity of the semiconducting layers of the prior art conventionally of less than $0.5 \times 10^3$ Ω·m (i.e., an electrical conductivity of $2.10^{-3}$ S/m).

The invention claimed is:
1. An electrical device comprising:
a crosslinked layer obtained from a polymer composition comprising at least one polymer comprising at least one epoxy functional group, wherein the polymer composition additionally comprises a nonpolymeric com- pound as crosslinking agent comprising at least one reactive functional group capable of reacting with the epoxy functional group of said polymer in order to make possible the crosslinking of said polymer, the crosslinking agent being chosen from:
- an aminoacid as nonpolymeric compound comprising at least one amine functional group and at least one carboxyl functional group,
- a nonpolymeric compound comprising at least one anhydride functional group in combination with a crosslinking catalyst, and
- one of their mixtures.

2. The device as claimed in claim 1, wherein the device is an electric cable comprising an elongated electrically conducting component surrounded by said crosslinked layer.

3. The device as claimed in claim 1, wherein the device is is an electric cable accessory, said accessory comprising said crosslinked layer.

4. The device as claimed in claim 3, wherein the accessory is an electric cable joint or termination.

5. The device as claimed in claim 1, wherein the polymer comprises at least one compound chosen from glycidyl esters.

6. The device as claimed in claim 1, wherein the polymer comprises at most 10% by weight of epoxy functional group.

7. The device as claimed in claim 1, wherein the polymer comprises at least 0.1% by weight of epoxy functional group.

8. The device as claimed in claim 1, wherein the epoxy functional group is grafted to the polymer.

9. The device as claimed in claim 1, wherein the polymer comprising at least one epoxy functional group is a copolymer obtained from at least two monomers, one of the monomers comprising said epoxy functional group.

10. The device as claimed in claim 1, wherein the polymer additionally comprises at least one acrylate functional group.

11. The device as claimed in claim 1, wherein the amine functional group of the crosslinking agent is a primary or secondary amine.

12. The device as claimed in claim 1, wherein the carbon chain of the amino acid, separating the carboxyl functional group form the amine functional group, has from 1 to 50 carbon atoms.

13. The device as claimed in claim 1, wherein the crosslinking catalyst is of the Lewis base type.

14. The device as claimed in claim 1, wherein the polymer composition additionally comprises a filler.

15. The device as claimed in claim 1, wherein the crosslinked layer is an electrically insulating layer.

16. The device as claimed in claim 1, wherein the crosslinked layer is a semiconducting layer.

17. The device as claimed in claim 1, wherein said device further comprises a first semiconducting layer surrounding the elongated electrically conducting component, an electrically insulating layer surrounding the first semiconducting layer and a second semiconducting layer surrounding the electrically insulating layer, the crosslinked layer being at least one of these three layers.

18. The device as claimed in claim 1, wherein the nonpolymeric compound comprising at least one anhydride functional group additionally comprises an aliphatic chain comprising at least five carbon atoms.

* * * * *